Feb. 6, 1934.  C. L. TURNER  1,945,668
MILK STRAINER
Filed May 13, 1933   2 Sheets-Sheet 1
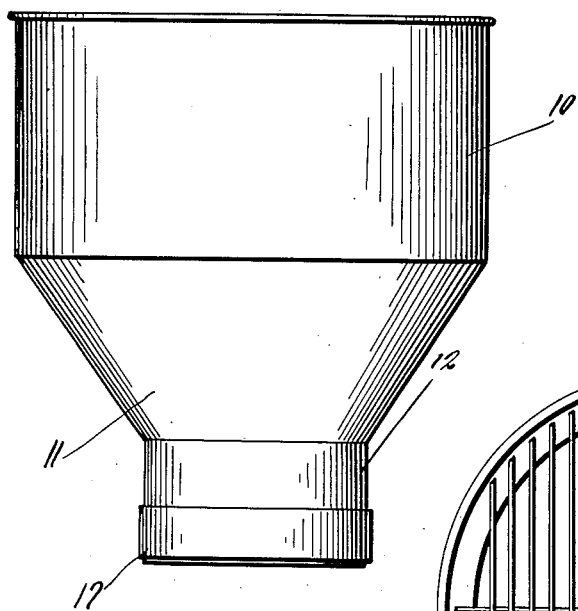
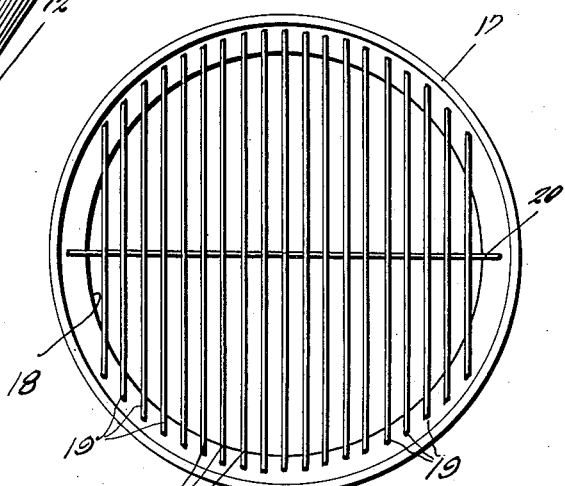
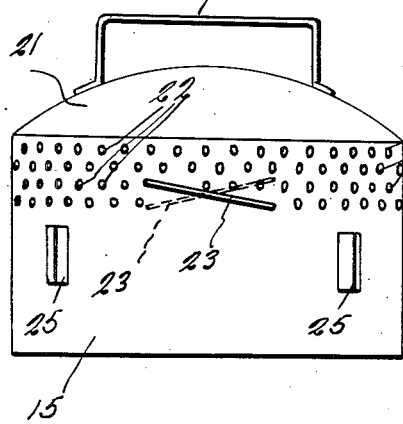
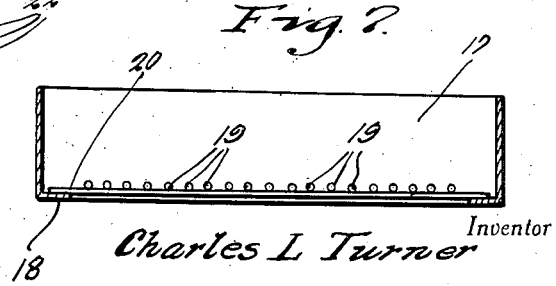
Inventor
Charles L Turner
By *Clarence A. O'Brien*
Attorney Feb. 6, 1934.  C. L. TURNER  1,945,668
MILK STRAINER
Filed May 13, 1933  2 Sheets-Sheet 2

Inventor
Charles L. Turner
By Clarence A. O'Brien
Attorney

Patented Feb. 6, 1934

1,945,668

UNITED STATES PATENT OFFICE 1,945,668

MILK STRAINER

Charles L. Turner, Berlin, Wis.

Application May 13, 1933. Serial No. 670,979

4 Claims. (Cl. 210—159)

This invention relates to a strainer particularly adapted for use in straining milk or other similar liquids.

More particularly the invention has reference to a strainer of the character above mentioned wherein is employed a filtering pad of cotton in which a final and more complete straining of the liquid is carried out.

A salient object of the invention is to provide in a strainer of the type mentioned an assembly of elements which will positively secure the filter pad in position against the force or action of the milk or other liquid passing through the strainer.

Further in accordance with the present invention a combination is provided which will insure maintaining the major portion of the filtering pad free of all the heavier sediments which is an improvement over the strainers now commonly used and which are objectionable in that they permit the heavy dirt and sand and other foreign matter to come into direct contact with the filtering pad and thus materially lessen the straining surface of the pad.

Further in accordance with the present invention improved means is provided for holding the breaker or main strainer element in position against canting and is held in position at all times to insure an effective straining of the milk prior to the filtering thereof.

The invention together with its numerous objects and advantages will be best understood from a study of the following description taken in connection with the accompanying drawings wherein is illustrated a preferred embodiment of the invention.

It is to be understood at the outset that the invention is in no wise intended to be restricted to the precise details of construction, combination and arrangement of elements as shown and described other than may be necessary to meet the requirements of the prior art and scope of the appended claims.

In the drawings:

Figure 1 is an elevational view of the improved strainer.

Figure 3 is an elevational view of the breaker or main straining element.

Figure 4 is a top plan view of the breaker or main strainer element.

Figure 5 is a fragmentary elevational view of the main strainer element, the filtering pad and a retaining band therefor, the mentioned parts being shown separated.

Figure 6 is a plan view of a filtering pad support.

Figure 7 is a transverse sectional view through the filtering pad support; and

Figure 8 is an enlarged fragmentary sectional elevational view illustrating certain details of construction to be hereinafter more fully referred to.

Figure 2:
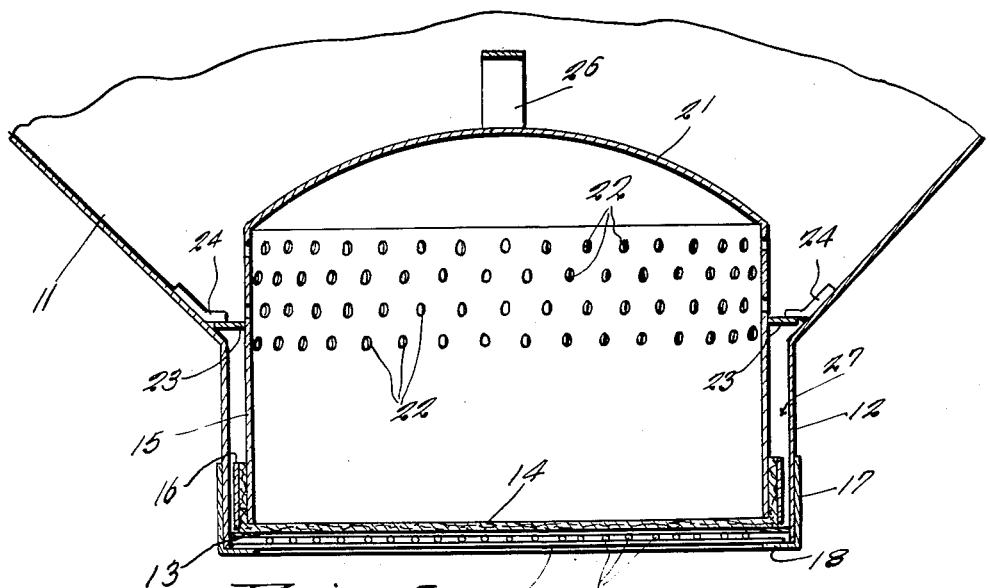
Figure 2 is an enlarged fragmentary vertical sectional view through the strainer.
Figures 4, 5, 8:
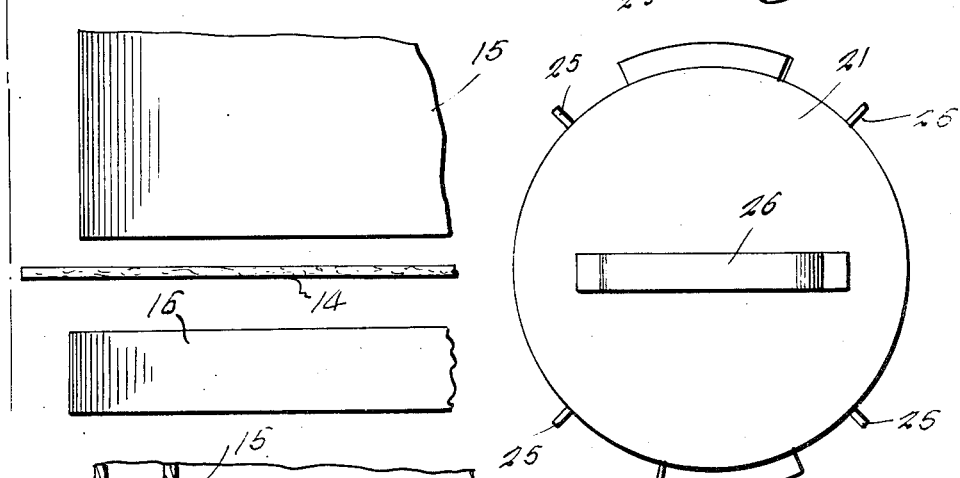

Referring to the drawings by reference numerals it will be seen that the strainer comprises an outer casing or funnel 10 having an inverted frusto-conical body portion 11 and a tubular neck 12. Inwardly from the lower end thereof the neck 12 is provided with an annular flange or ledge 13 on which rests a filtering pad 14 of cotton or other suitable material detachably secured to the lower end of a strainer or breaker element 15. (See Figures 2 and 8.)

As shown the strainer element 15 is removably arranged within the neck 12 while the pad 14, as shown, is disposed over the lower edge of the strainer or breaker member 15, and has its marginal edges disposed between the wall of the strainer or breaker member 15 and a clamping band 16.

A strainer support extends across the lower edge of the neck 12 and the strainer support as shown in Figures 6 and 7 comprises an annular frame 17 provided with an inturned flange 18 to which are secured the ends of a plurality of relatively spaced cross bars 19 and a cross bar 20 extending transversely of the cross bars 19. The annular frame 17 telescopes the neck 12 and is snugly fitted thereto for holding the bars 19 and 20 below the pad 14 for supporting the same and preventing undue sagging of the pad.

The strainer or breaker element 15 comprises a cylindrical body having an imperforate and preferably dome shaped top 21, a wide band or zone of perforations 22 around the body at the upper portion thereof while the lower portion of the body is imperforate as shown.

Provided on diametrically opposite sides of the perforated band or zone portion thereof the body of the screen or breaker is provided with lugs 23 disposed at an inclination or pitch to coact with lugs 24 provided internally adjacent the lower end of the frusto-conical portion 11 of the funnel.

The body of the strainer 15 below the perforated zone thereof is provided with a series of lugs 25 engageable with the wall of the neck 12 for centering the strainer 15 with respect to said neck. Also, the strainer has secured to the top 21 thereof a suitable handle 26 to facilitate handling of the strainer.

When the frame 17 and the funnel are assembled as shown in the drawings, and also the strainer 15, filtering pad 14, and retaining band 16 for the pad are assembled, the strainer 15 is passed down into the funnel 10 until the pad 14 rests upon the ledge 13, when the strainer 15 is then rotated so that the lugs 23 thereon engage the lugs 24. Manifestly lugs 23 and 24 will cooperate upon the turning movement of the strainer to force the latter downwardly within the neck 12. When the lugs are tightly engaged with each other the pad 14 will make a substantially liquid tight contact with the ledge 13.

With this combination it will be seen that when milk is poured into the funnel 10 the heavy foreign matter will drop into the space 27 between the walls of the strainer 15 and neck 12 while the milk strikes the closed top 21 of the breaker or strainer 15 which serves to break the force of the milk. The milk flows downwardly and as it accumulates in the space 27 rises to pass through the perforations 22 and into the interior of the strainer 15, and from the strainer 15 the milk filters through the pad 14 into a receptacle, such as for example a milk can into the top of which the funnel is adapted to be inserted in a manner well known in the art.

With this combination it will be apparent that the strainer element 15 is securely retained against being casually displaced by the force of the milk being poured into the funnel; and that also the filtering pad 14 will be securely held against displacement by the force of the milk. while at the same time the major portion of the pad will be kept free of accumulation of large particles of foreign matter thus enabling the operator to obtain an efficient filtering of the milk subsequent to the straining of the milk by the strainer 15 and as a final step in the straining of the milk.

It is also apparent that the strainer 15 may be readily removed from the funnel and the pad 14 easily removed from the lower end of the strainer for cleaning. Also, the cross bars 17 will provide an efficient support for the pad to prevent undue sagging thereof and thus serve in maintaining the filtering efficiency of the pad 14.

Having thus described my invention, what I claim as new is:

1. A milk strainer comprising a funnel provided with an internal ledge, a strainer having a cylindrical body provided with an imperforate dome shaped top and a perforated zone below said top, a filtering pad extending across the lower end of the body of the strainer and having its edges extending upwardly into contact with the outer surfaces of said strainer body, and a retaining band clamping the said upturned edges of the pad against the strainer body for securing the pad in position.

2. A milk strainer comprising a funnel provided with an internal ledge, a strainer having a cylindrical body provided with an imperforate dome shaped top and a perforated zone below said top, a filtering pad extending across the lower end of the body of the strainer and having its edges extending upwardly into contact with the outer surfaces of said strainer body, and a retaining band clamping the said upturned edges of the pad against the strainer body for securing the pad in position, and a pad supporting means at the lower end of the funnel comprising a frame engaging the outer surface of the funnel, and cross bars mounted in the frame and extending across the lower end of the funnel beneath said pad.

3. A milk strainer comprising a funnel provided with an internal ledge, a strainer having a cylindrical body provided with an imperforate dome shaped top and a perforated zone below said top, a filtering pad extending across the lower end of the body of the strainer and having its edges extending upwardly into contact with the outer surfaces of said strainer body, and a retaining band clamping the said upturned edges of the pad against the strainer body for securing the pad in position, and a pad supporting means at the lower end of the funnel comprising a frame engaging the outer surface of the funnel, and cross bars mounted in the frame and extending across the lower end of the funnel beneath said pad, internal lugs on the walls of the funnel spaced upwardly from said ledge, and oppositely pitched lugs on the upper portion of the strainer body engageable with the first named lugs for locking the strainer within the funnel and the pad pressed into fluid tight engagement with said ledge.

4. A strainer comprising a funnel having a cylindrical neck provided internally with a flat annular ledge, an inverted substantially cup-shaped strainer disposed within said neck, spacing lugs on the walls of said strainer for retaining the strainer centered within said neck, a filtering pad extending across the lower edge of the cup-shaped strainer, a clamping band for the pad extending concentrically to said cup-shaped strainer, the edges of said pad being disposed between said band and the walls of the cup-shaped strainer, and interengaging means on said funnel and said cup-shaped strainer for locking the latter within the funnel with the pad pressed tightly against said ledge.

CHARLES L. TURNER.